(12) United States Patent
Sangameswaran et al.

(10) Patent No.: US 8,936,531 B2
(45) Date of Patent: Jan. 20, 2015

(54) STOP-IN-PARK CONTROL FOR MICRO-HYBRID VEHICLES

(71) Applicant: Ford Global Technologies, LLC, Dearborn, MI (US)

(72) Inventors: Sangeetha Sangameswaran, Canton, MI (US); Mathew Alan Boesch, Plymouth, MI (US); J. Anthony Lockwood, Canton, MI (US); George Edmund Walley, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 185 days.

(21) Appl. No.: 13/772,831

(22) Filed: Feb. 21, 2013

(65) Prior Publication Data

US 2014/0235406 A1    Aug. 21, 2014

(51) Int. Cl.
*F16H 59/74* (2006.01)
*B60W 10/06* (2006.01)
*B60W 10/10* (2012.01)

(52) U.S. Cl.
CPC ............... *B60W 10/06* (2013.01); *B60W 10/10* (2013.01); *Y10S 477/901* (2013.01)

USPC .............................................. 477/99; 477/901

(58) Field of Classification Search
USPC ............... 701/54, 117; 477/99, 110, 111, 901
See application file for complete search history.

(56) References Cited

U.S. PATENT DOCUMENTS

| 6,553,287 | B1 | 4/2003 | Supina et al. | |
| 6,830,534 | B2 * | 12/2004 | Seibertz et al. | 477/92 |
| RE40,164 | E | 3/2008 | Kuang et al. | |
| 8,306,725 | B2 * | 11/2012 | Son et al. | 701/123 |
| 2013/0199335 | A1 * | 8/2013 | Nedorezov et al. | 74/7 C |
| 2013/0255353 | A1 * | 10/2013 | Zawacki et al. | 73/1.06 |

* cited by examiner

*Primary Examiner* — Justin Holmes
(74) *Attorney, Agent, or Firm* — David B. Kelley; Brooks Kushman P.C.

(57) ABSTRACT

A stop/start system of a micro-hybrid vehicle may selectively initiate an engine auto start in response to a PRNDL gear lever/transmission being moved/shifted out of DRIVE after an engine auto stop and a determination that the vehicle is located, for example, in an intersection or railroad crossing prior to the PRNDL gear lever/transmission being moved/shifted into REVERSE.

7 Claims, 2 Drawing Sheets

STOP-IN-PARK CONTROL FOR MICRO-HYBRID VEHICLES

TECHNICAL FIELD

This disclosure relates to micro-hybrid or stop/start vehicles and controlling stop/start activities during a gear change.

BACKGROUND

Micro-hybrid vehicles may be equipped with an engine autostop function. This function shuts down the engine during certain periods of operation in order to conserve fuel. For example, the autostop function may be engaged when the vehicle is stopped rather than permitting the engine to idle. The engine may be restarted when the driver releases the brake or actuates the accelerator.

SUMMARY

A method for controlling a stop/start vehicle includes, in response to a transmission being shifted out of DRIVE after an engine has been auto stopped, selectively initiating an auto start of the engine prior to the transmission being shifted into a gear other than DRIVE based on a location of the vehicle. An auto start of the engine may be initiated prior to the transmission being shifted into REVERSE in response to the transmission being shifted out of DRIVE after the engine has been auto stopped if the vehicle is located within an intersection. An auto start of the engine may be initiated prior to the transmission being shifted into REVERSE in response to the transmission being shifted out of DRIVE after the engine has been auto stopped if the vehicle is located on a railroad crossing.

A stop/start vehicle may include an engine, a transmission, and a stop/start system. The stop/start system, in response to the transmission being shifted out of DRIVE after the engine has been auto stopped, selectively initiates an auto start of the engine prior to the transmission being shifted into a gear other than DRIVE based on a location of the vehicle. An auto start of the engine may be initiated prior to the transmission being shifted into REVERSE in response to the transmission being shifted out of DRIVE after the engine has been auto stopped if the vehicle is located within an intersection. An auto start of the engine may be initiated prior to the transmission being shifted into REVERSE in response to the transmission being shifted out of DRIVE after the engine has been auto stopped if the vehicle is located on a railroad crossing.

A stop/start vehicle includes an engine, a PRNDL gear lever, and a stop/start system. The stop/start system, in response to the PRNDL gear lever being move out of DRIVE after the engine has been auto stopped and the vehicle being located in an intersection or railroad crossing, initiates an auto start of the engine prior to the PRNDL gear lever being moved into REVERSE.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Stop/start or micro-hybrid vehicles are powered by conventional internal combustion engines and equipped with a stop/start system controlling autostop and autostart functions. The stop/start system may autostop the engine when the vehicle is stopped and the engine is not required for propulsion or other purposes. At a later time, the stop/start system may autostart the engine when required for propulsion or other purposes. By disabling the engine when possible, overall fuel consumption is reduced. Unlike true hybrid vehicles, stop/start vehicles are not capable of pure electric propulsion. Furthermore, unlike true hybrid vehicles, stop/start vehicles are not equipped with a traction battery, but rather with a conventional starting, lighting, and ignition (SLI) battery.

Controllers may initiate an autostop or autostart the engine. As the vehicle comes to a stop, for example, the controllers may issue a command to begin the process to stop the engine, thus preventing the alternator or integrated starter generator from providing electric current to the electrical loads. The battery may provide electric current to the electrical loads while the engine is stopped. As the brake pedal is disengaged (and/or the accelerator pedal is engaged) after an engine autostop, the controllers may issue a command to begin the process to start the engine, thus enabling the alternator or integrated starter generator to provide electric current to the electrical loads.

Figure 1:
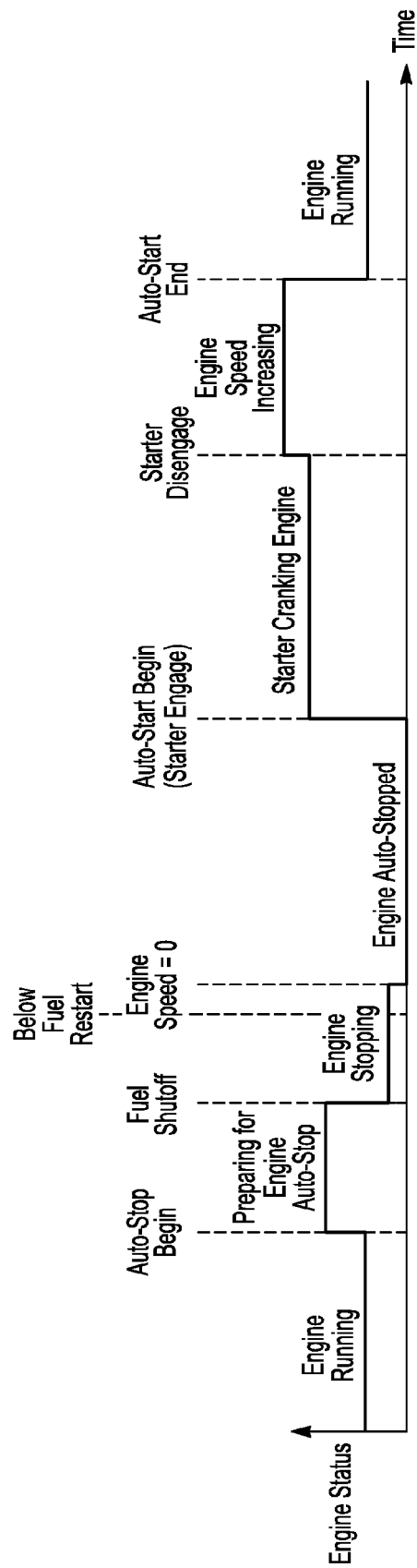
FIG. 1 is a plot illustrating engine status during an autostop.

With reference to FIG. 1, an engine stop/start sequence may include several stages: "auto-stop begin," which marks the beginning of the engine autostop; "preparing for engine auto-stop," which is the time period during which vehicle systems as well as the engine are prepared for the impending engine stop (if an auto stop inhibit condition is detected during this stage, the preparation for the impending engine stop is discontinued and the vehicle systems and engine are returned to their normal operating modes); "fuel shutoff," which marks the point at which fuel flow to the engine is stopped; "engine stopping," which is the time period during which the engine speed is reduced to 0; "below fuel restart," which marks the point after which if a restart is requested to inhibit the auto stop during the "engine stopping" stage, the starter may need to be engaged to crank the engine (if a restart is requested before "below fuel restart" and during the "engine stopping" stage, the engine may be restarted to inhibit the auto stop by turning the flow of fuel back on); "engine speed=0," which marks the point at which the engine speed is near or equal to 0; "engine auto-stopped," which is the time period during which the engine is off; "starter engage," which marks the point at which the starter starts to crank the engine in an effort to start the engine (in response to detecting an engine autostart condition); "starter cranking engine," which is the time period during which the engine is unable to crank under its own power; "starter disengage," which marks the point at which the engine is able to crank under its own power; "engine speed increasing," which is the time period during which the speed of the engine increases to its running speed; and, "auto-start end," which marks the point at which the speed of the engine achieves its running speed (a speed at or above target idle speed).

In some stop/start vehicles, the autostop function is available only when the PRNDL gear lever/transmission is in DRIVE. In such a vehicle, the engine is automatically restarted when the gear lever/transmission is moved out of DRIVE. However, this behavior is undesirable in some situations. If a vehicle has reached its final destination and the engine is stopped, then restarting the engine when the gear lever/transmission is moved out of DRIVE and into PARK causes an unnecessary engine restart. Unnecessary engine restarts can waste fuel and also lead to unneeded wear on the engine.

In an alternate stop/start configuration known as Stop in Park or "SIP", the engine is not restarted when the gear lever is moved out of DRIVE. Instead, the stop/start system does not make a determination of whether to restart the engine until the gear lever has reached its final position. A SIP configuration prevents an unnecessary engine restart when the gear lever is moved from DRIVE to PARK. However in some situations, it is desirable to restart the engine as soon as the gear lever is moved out of DRIVE, prior to the gear lever reaching its final position. For example, when an engine is stopped and the gear lever is moved from DRIVE to REVERSE, if the engine is not restarted right away then a noticeable delay is introduced while the engine restarts prior to the reverse launch. These delays are undesirable in situations where a driver is required to quickly reverse the vehicle's direction of motion, such as when the vehicle has stopped in an intersection or has stopped on a railroad crossing.

Certain systems and methods disclosed herein may provide an improved SIP configuration for an engine having autostop functionality and a base autostart/stop logic. When the engine is stopped and the gear lever is moved out of DRIVE, a controller may utilize inputs from a variety of sensors to determine whether the vehicle has reached its final destination. If a determination is made that the vehicle has reached its final destination, then the controller may prevent the engine from restarting. The controller may also determine whether the vehicle is in a location where the likelihood of the gear lever being moved into PARK is low. If the vehicle is in a location where the likelihood of the gear lever being moved into PARK is low, then the controller may request an automatic engine restart before the gear lever reaches its final position. If the vehicle is not in such a location, the controller may use the base autostart/stop logic.

Figure 2:
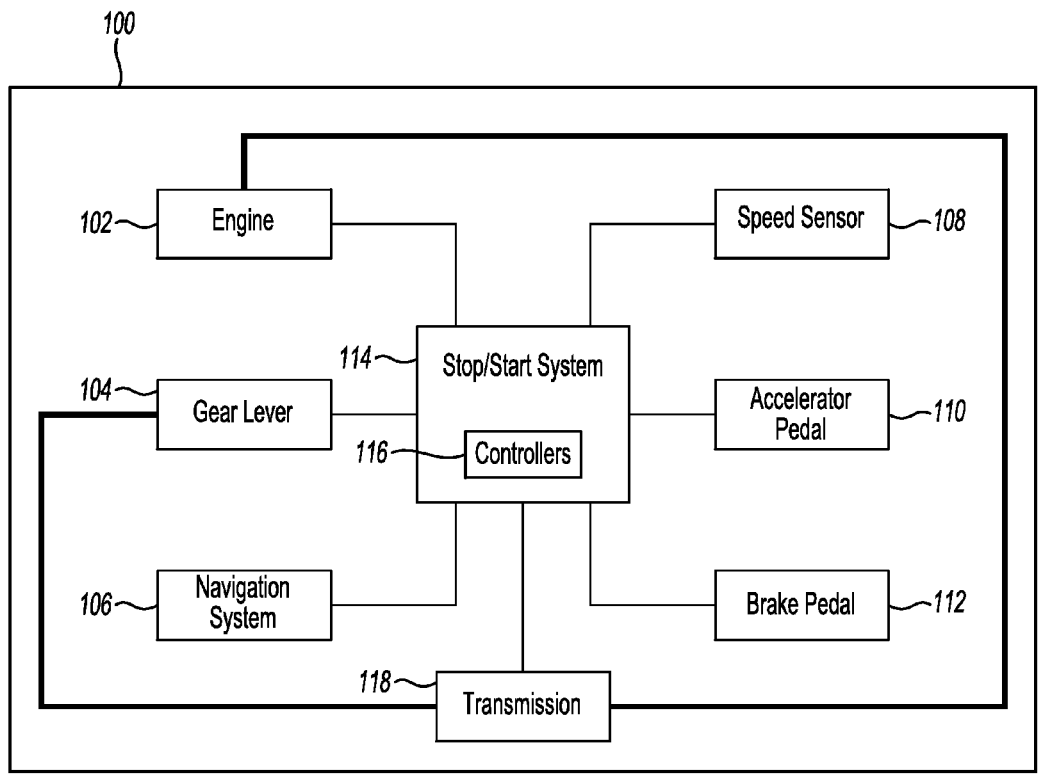
FIG. 2 is a block diagram of a stop/start vehicle.

With reference to FIG. 2, a schematic representation of a vehicle 100 having autostop function is shown. The vehicle 100 includes an engine 102, a gear lever 104, a navigation system 106, a speed sensor 108, an accelerator pedal 110, a brake pedal 112, at least one controller 114, and a transmission 118. The engine 102, gear lever 104, navigation system 106, speed sensor 108, accelerator pedal 110, brake pedal 112, and transmission 118 are all in communication with or under the control of the stop/start system 114, as indicated by thin solid line. The engine 102 and gear lever 104 are operably connected to the transmission 118, as indicated by heavy solid line. In one configuration, the navigation system 106 may be an in-vehicle GPS system. In another configuration, the navigation system 106 may comprise a location-enabled mobile device such as a cellular phone or standalone GPS unit. Other configurations are, of course, also possible.

The stop/start system 114 includes at least one controller 116 that can issue autostop commands and autostart commands to the engine 102 during vehicle operation. The stop/start system 114 may comprise a base autostart/stop logic that issues autostop commands and autostart commands—to achieve, among other things, the stages described with reference to FIG. 1—based on signals from at least the gear lever 104, speed sensor 108, accelerator pedal 110, and brake pedal 112. The base autostart/stop logic may utilize a SIP configuration. In short, the engine 102 will be shut down in response to an autostop command and will be restarted in response to an autostart command.

Figure 3:
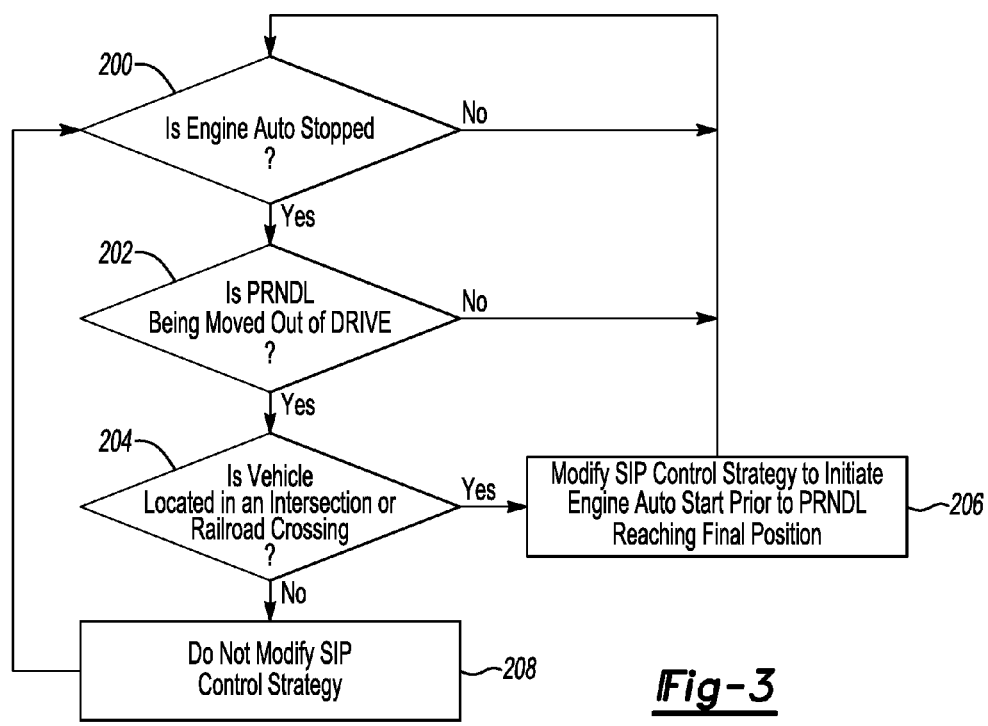
FIG. 3 is a flowchart illustrating an algorithm for controlling a start/stop vehicle.

In one embodiment, described with reference to FIGS. 2 and 3, it is determined whether the engine is auto stopped at operation 200. If no, the algorithm returns to operation 200. If yes, it is determined whether the PRNDL gear lever is being moved to shift the transmission out of DRIVE at operation 202. If no, the algorithm returns to operation 200. If yes, it is determined whether the vehicle is located in an intersection or railroad crossing at operation 204. This determination may, in some embodiments, be performed by the controllers 116 in response to signals from the navigation system 106. If yes, the SIP stop/start control strategy is modified to initiate an auto start prior to the PRNDL gear lever reaching its final position at operation 206. This restart request may be performed by the stop/start system 114. The algorithm then returns to operation 200. Returning to operation 204, if no, the SIP stop/start control strategy is not modified at operation 208. That is, the control strategy will wait for the PRNDL gear lever to reach its final position before determining whether to initiate an auto start of the engine. The algorithm then returns to operation 200.

In some configurations after the gear lever 104 is moved out of DRIVE while the engine 102 is autostopped, the controllers 116 determine the final destination of the vehicle. This determination may be based upon a location entered into navigation system 106. In an alternate configuration, the determination may be based upon a user-saved location, which may be stored by navigation system 106. In yet another configuration, the determination may be based upon historical driving statistics, including the day of week or time of day. Once the vehicle final destination has been determined, the controllers 116 determine whether the vehicle has reached its final destination. This determination may be based upon a comparison of the final destination with a present vehicle location.

If a determination is made that the vehicle has reached its final destination, then the stop/start system 114 prevents an automatic restart. In this way, unnecessary vehicle restarts are prevented. If a determination is made that the vehicle has not reached its final destination, then the controllers 116 determine whether the vehicle is in a location where the probability of the gear lever being moved from DRIVE to PARK is low. By way of example, the probability of the gear being moved from DRIVE to PARK is low if the navigation system 106 detects that the vehicle is located in an intersection, on a railroad crossing, or in other locations where a vehicle is unlikely to park. The determination of whether the vehicle is in a location where the likelihood of the gear lever being moved from DRIVE to PARK is low may also be based upon historical driving statistics.

If a determination is made that the vehicle is in a location where the probability of the gear lever being moved from DRIVE to PARK is low, then the stop/start system 114 signals the engine to restart. The stop/start system 114 sends the signal before the gear lever reaches its final position. As an example, when the transmission is shifted out of DRIVE, the stop/start system 114 may signal the engine to restart prior to the transmission being shifted into REVERSE.

If a determination is made that the vehicle is not in a location where the probability of the gear lever being moved from DRIVE to PARK is low, then the controllers 114 operate according to the base autostart/stop logic. If the base autostart/stop logic is a SIP configuration, then the controllers 114 will make a determination of whether to autostart the engine after the gear lever reaches its final position as follows: if the gear lever is moved into PARK, then the engine will not be autostarted; if the gear lever is moved into a gear that is not PARK then the engine will be autostarted.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for controlling a stop/start vehicle comprising:
   in response to a transmission being shifted out of DRIVE after an engine has been auto stopped, selectively initiating an auto start of the engine prior to the transmission being shifted into a gear other than DRIVE based on a location of the vehicle.

2. The method of claim 1, wherein an auto start of the engine is initiated prior to the transmission being shifted into REVERSE in response to the transmission being shifted out of DRIVE after the engine has been auto stopped if the vehicle is located within an intersection.

3. The method of claim 1, wherein an auto start of the engine is initiated prior to the transmission being shifted into REVERSE in response to the transmission being shifted out of DRIVE after the engine has been auto stopped if the vehicle is located on a railroad crossing.

4. A stop/start vehicle comprising:
   an engine;
   a transmission; and
   a stop/start system programmed to, in response to the transmission being shifted out of DRIVE after the engine has been auto stopped, selectively initiate an auto start of the engine prior to the transmission being shifted into a gear other than DRIVE based on a location of the vehicle.

5. The vehicle of claim 4, wherein an auto start of the engine is initiated prior to the transmission being shifted into REVERSE in response to the transmission being shifted out of DRIVE after the engine has been auto stopped if the vehicle is located within an intersection.

6. The vehicle of claim 4, wherein an auto start of the engine is initiated prior to the transmission being shifted into REVERSE in response to the transmission being shifted out of DRIVE after the engine has been auto stopped if the vehicle is located on a railroad crossing.

7. A stop/start vehicle comprising:
   an engine;
   a PRNDL gear lever; and
   a stop/start system programmed to, in response to the PRNDL gear lever being moved out of DRIVE after the engine has been auto stopped and the vehicle being located in an intersection or railroad crossing, initiate an auto start of the engine prior to the PRNDL gear lever being moved into REVERSE.

* * * * *